United States Patent
Chia-Feng et al.

(10) Patent No.: US 12,556,717 B2
(45) Date of Patent: Feb. 17, 2026

(54) NP-MICRO FOR VIDEO ARTIFICIAL INTELLIGENCE (AI) HARDWARE (HW) PIPELINE

(71) Applicant: MEDIATEK INC., Hsinchu (TW)

(72) Inventors: Hsu Chia-Feng, Hsinchu (TW); Chih-Hsiang Hsiao, Hsinchu (TW); Shih-Yong Su, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 84 days.

(21) Appl. No.: 18/422,729

(22) Filed: Jan. 25, 2024

(65) Prior Publication Data

US 2024/0314334 A1    Sep. 19, 2024

Related U.S. Application Data

(60) Provisional application No. 63/490,533, filed on Mar. 16, 2023.

(51) Int. Cl.
*H04N 19/119* (2014.01)
*H04N 19/176* (2014.01)

(52) U.S. Cl.
CPC ......... *H04N 19/176* (2014.11); *H04N 19/119* (2014.11)

(58) Field of Classification Search
CPC .......................... H04N 19/119; H04N 19/176
See application file for complete search history.

(56) References Cited

U.S. PATENT DOCUMENTS

| | | | |
|---|---|---|---|
| 11,977,962 B2* | 5/2024 | Cheruvu | H04L 9/0643 |
| 12,164,922 B2* | 12/2024 | Kumar | G06F 9/30145 |
| 2011/0208892 A1 | 8/2011 | Meyers | |
| 2018/0103261 A1* | 4/2018 | Sun | H04N 19/51 |
| 2020/0211511 A1* | 7/2020 | Schluessler | G09G 3/003 |
| 2020/0344474 A1* | 10/2020 | Leleannec | G06T 9/002 |
| 2020/0374534 A1* | 11/2020 | Chen | G06F 18/22 |
| 2022/0035684 A1* | 2/2022 | Gupte | G06F 9/30079 |
| 2022/0197651 A1* | 6/2022 | Kumar | G06F 9/3851 |
| 2023/0035306 A1* | 2/2023 | Liu | H04N 19/597 |
| 2023/0297406 A1* | 9/2023 | Rogers | G06F 9/45558 |
| 2024/0073449 A1* | 2/2024 | Novikov | G06T 5/70 |
| 2024/0297910 A1* | 9/2024 | Shen | H04L 65/612 |

FOREIGN PATENT DOCUMENTS

| | | |
|---|---|---|
| TW | 202101228 A | 1/2021 |
| TW | I768799 B | 6/2022 |

* cited by examiner

*Primary Examiner* — Tsion B Owens
(74) *Attorney, Agent, or Firm* — Winston Hsu

(57) ABSTRACT

Aspects of the present disclosure provide a video playback system. For example, the video playback system can include a video controller configured to receive one or more video frames and partition each of the video frames into a plurality of video tiles, a video decoder configured to decode one of the video tiles partitioned from each of the video frames, an artificial intelligence (AI) accelerator configured to execute an executable AI model on the decoded video tile, a display configured to display the processed video tile, and a pipeline manager installed in the video controller. The pipeline manager can be configured to control the video decoder to decode the video tile, control the AI accelerator to execute the executable AI model on the decoded video tile, and control the display to display the processed video tile.

17 Claims, 6 Drawing Sheets

NP-MICRO FOR VIDEO ARTIFICIAL INTELLIGENCE (AI) HARDWARE (HW) PIPELINE

CROSS-REFERENCE TO RELATED APPLICATIONS

This present application claims the benefit of U.S. Provisional Application No. 63/490,533 filed on Mar. 16, 2023, which is incorporated herein by reference in its entirety.

TECHNICAL FIELD

The present disclosure relates to video processing, and specifically relates to hardware-based processing of video tiles partitioned from video frames.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Aspects of the present disclosure provide a video playback system. For example, the video playback system can include a video controller, a video decoder coupled to the video controller, an artificial intelligence (AI) accelerator coupled to the video controller and the video decoder, a display coupled to the video controller and the AI accelerator, and a pipeline manager installed in the video controller. The video controller can be configured to receive one or more video frames and partition each of the video frames into a plurality of video tiles. The video decoder can be configured to decode a video tile of the video tiles partitioned from each of the video frames to generate a decoded video tile. The AI accelerator can be configured to receive the decoded video tile and execute an executable AI model on the decoded video tile to generate a processed video tile. The display can be configured to receive and display the processed video tile. The pipeline manager can be configured to control the video decoder to decode the video tile to generate the decoded video tile, control the AI accelerator to execute the executable AI model on the decoded video tile to generate the processed video tile, and control the display to display the processed video tile.

In an embodiment, the pipeline manager can control the AI accelerator to execute the executable AI model on the decoded video tile by issuing a synchronization signal to the AI accelerator when the video decoder generates the decoded video tile and control the display to display the processed video tile by receiving another synchronization signal issued by the AI accelerator when the AI accelerator generates the processed video tile.

In an embodiment, the video playback system can further include an AI engine installed in the video controller and coupled to the pipeline manager and the AI accelerator. The pipeline manager can be further configured to instruct the AI engine to trigger the AI accelerator to execute the executable AI model on the decoded video tile. In another embodiment, the AI engine can be configured for the executable AI model to be loaded thereinto. In various embodiments, the executable AI model can be prepared based on an AI model and generated in the AI engine.

In an embodiment, the video playback system can further include a memory coupled to the AI accelerator. The memory can be configured for the executable AI model to be loaded thereinto. In another embodiment, the memory can be protected by a first firewall. In various embodiments, the AI accelerator can be protected by a second firewall. For example, the second firewall can be the same as the first firewall.

In an embodiment, the executable AI model can be prepared based on an AI model and generated within a trusted execution environment (TEE) provided by a secure operating system (OS). For example, the memory can include a dynamic random access memory (DRAM). As another example, the memory can include an on-bus SRAM. As yet another example, the memory can include a serial flash memory.

In an embodiment, the AI accelerator can include a deep learning accelerator (DLA). For example, the DLA can include an accelerated processing unit (APU). In another embodiment, the video controller can include a central processing unit (CPU). In various embodiments, the video playback system can be installed on a smart phone.

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Artificial intelligence (AI) techniques, e.g., machine learning (ML), can be useful for solving a variety of myriad, complex computational problems, such as speech and image recognition, information analysis and classification, and machine translation. A ML model, such as a deep learning (DL) model, can be trained to extract and transform higher-level features from a set of training data. New data can then be applied to the well-trained DL model and be classified, for example, using the DL model. A DL model, such as a convolutional neural network (CNN) model, may consist of a plurality of neurons that are arranged in multiple layers. Tensor data input to the layers can be partitioned into blocks of filters and channels, called tiles, e.g., XY-partition tiles and K-partition tiles. Each of the convolution partitioned tiles requires iterative use of the available compute units, e.g., a spatial reuse case and a spatiotemporal reuse case.

Figure 1:
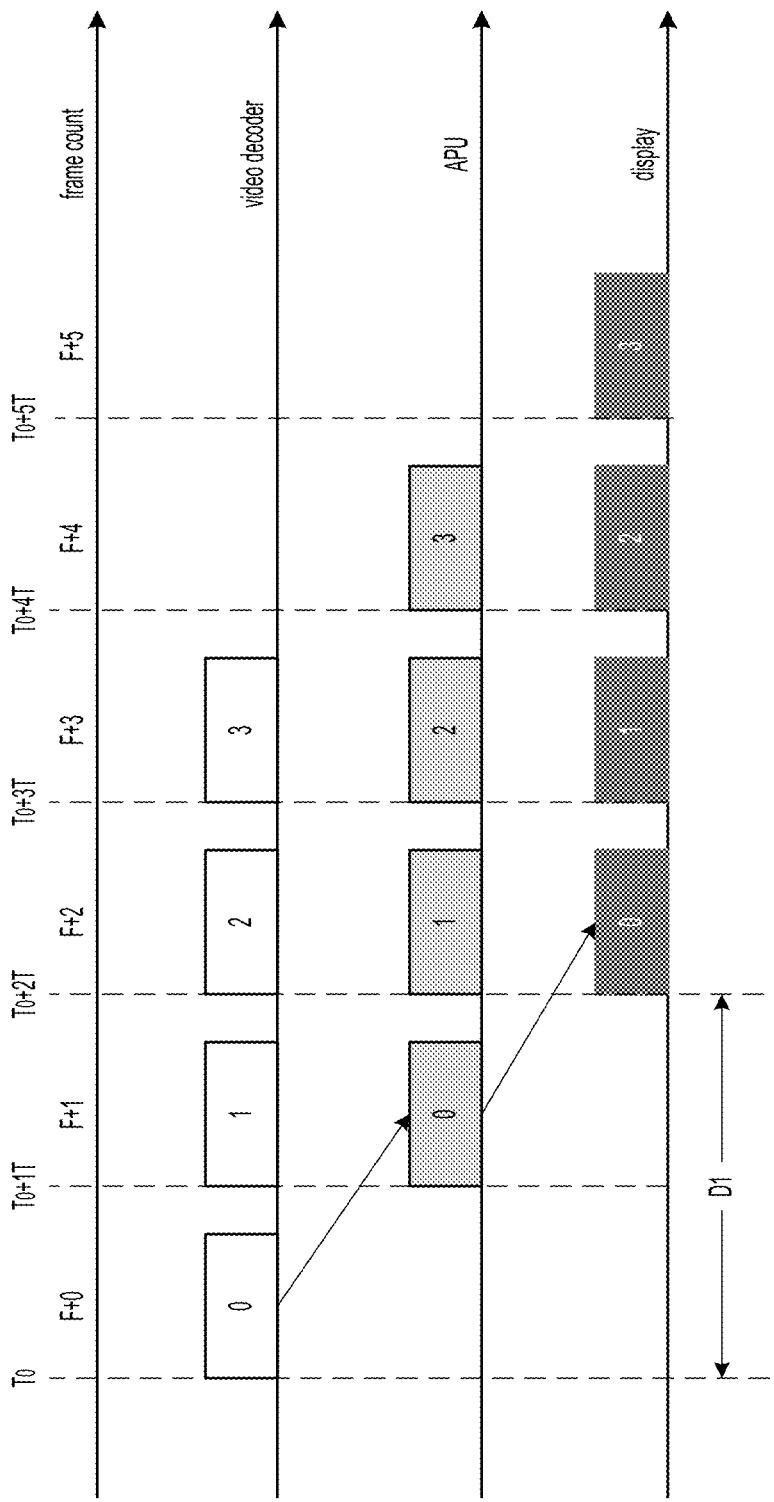
FIG. 1 shows a timeline of a plurality of streaming video frames that are decoded, processed and displayed.

Watching video programs is one of the most frequent things that people do on a smart phone in daily life. AI techniques can be employed to enhance the video quality, e.g., higher resolution, less noises, etc. For example, a video playback may simply be divided into three phases in a pipeline manner. As shown in FIG. 1, a plurality of video frames 0-3 will be decoded, processed and displayed. Firstly, a video decoder decodes the video frames 0-3 sequentially. For example, the video decoder decodes the frame 0 at time $T_0$, decodes the frame 1 at time $T_0+1T$, decodes the frame 2 at time $T_0+2T$, and so on. In an embodiment, the video decoder can decode 30 frames per second, and T is approximately equal to 33.3 ms. Secondly, a processor, e.g., an AI accelerator such as an accelerated processing unit (APU), receives the video frames and execute an AI model on the video frames to, for example, increase the resolution (for 360p to 1080p or even to 2K, for example), increase the chroma and reduce the noises of the video frames. For example, the APU receives the frame 0 and executes the AI model on the frame 0 at time $T_0+1T$ when the video decoder decodes the frame 1, receives the frame 1 and executes the AI model on the frame 1 at time $T_0+2T$ when the video decoder decodes the frame 2, and so on. Thirdly, a display (e.g., a monitor) displays the video frames. For example, the monitor displays the frame 0 at time $T_0+2T$ when the APU receives the frame 1 and executes the AI model on the frame 1 and the frame decoder decodes the frame 2, displays the frame 0 at time $T_0+2T$ when the APU receives the frame 1 and executes the AI model on the frame 1 and the frame decoder decodes the frame 2, and so on. Therefore, the frame decoder decodes the frame 2, the APU executes the AI model on the frame 1, and the monitor displays the frame 0 concurrently. In this case, with a software pipeline mechanism, a delay D1 of two frames is caused on the frame 0 when being displayed since being decoded. Such a delay D1 may severely impact the smoothness of video conferences, video phone calls, etc.

Figure 2:
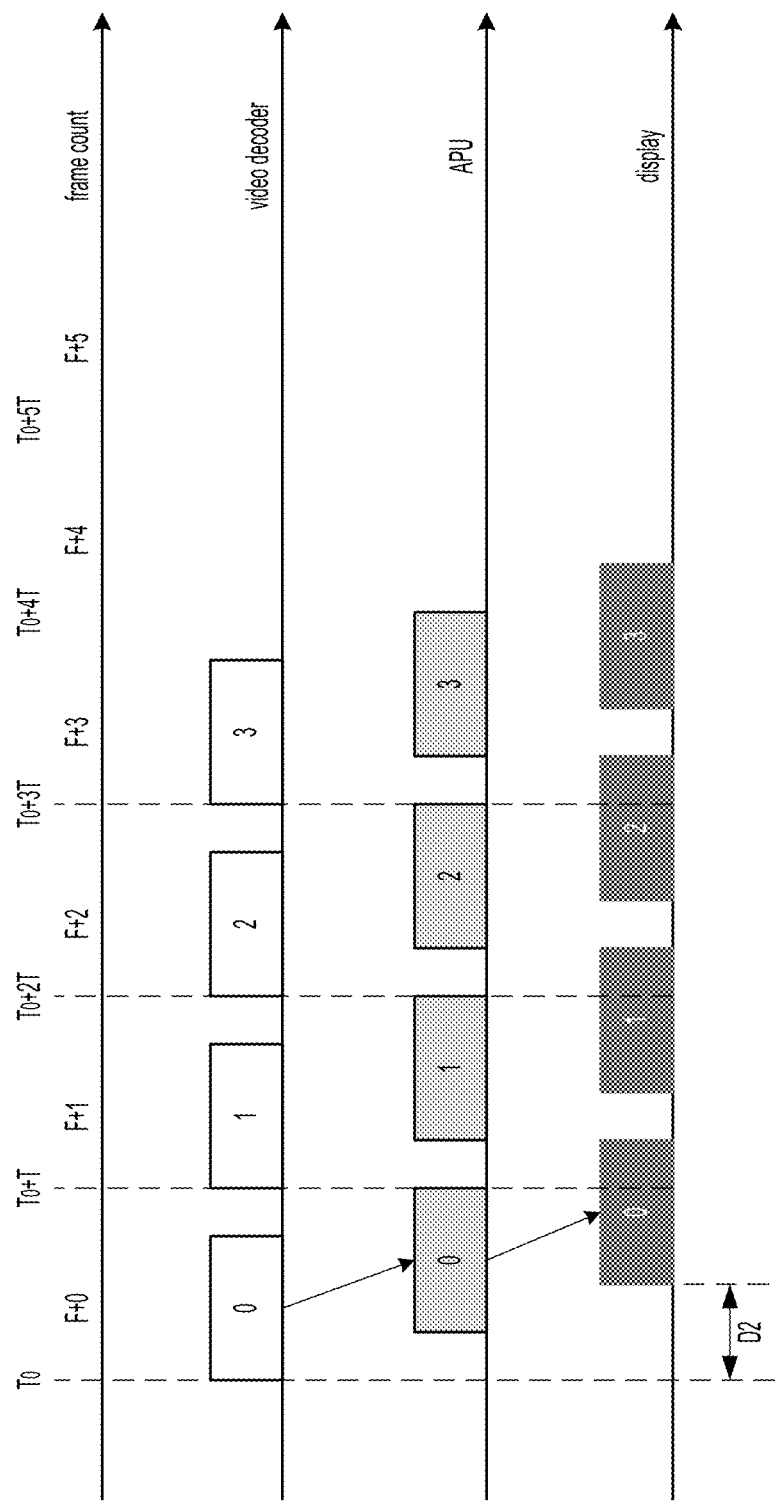
FIG. 2 shows another timeline of a plurality of streaming video frames that are decoded, processed and displayed.

FIG. 2 shows a timeline of a plurality of streaming video frames 0-3 that are decoded, processed and displayed. Different from the frames 0-3 shown in FIG. 1, which are decoded and processed frame by frame, the frames 0-3 shown in FIG. 2 are decoded and processed tile by tile. For example, each of the frames 0-3 shown in FIG. 2 can be partitioned into video tiles, e.g., XY-partition video tiles and K-partition video tiles, the video decoder decodes each of the video tiles, then the APU receives the video tile and executes an AI model on the video tile, and finally the monitor displays the video tile. In this case, still with a software pipeline mechanism, a shorter delay D2 of less than one frame, as compared with the delay D1 of two frames, is caused on the frame 0 when being displayed since being decoded. Though the delay D2 is shorter than the delay D1, the software-scheduled tile processing may not be able to finish the tiles on time due to the latency of software. To address this issue, a hardware pipeline mechanism is proposed, which uses hardware signals, e.g., synchronization signals, to handle the synchronization of various processing components, e.g., video controller and AI accelerator.

Figure 3:
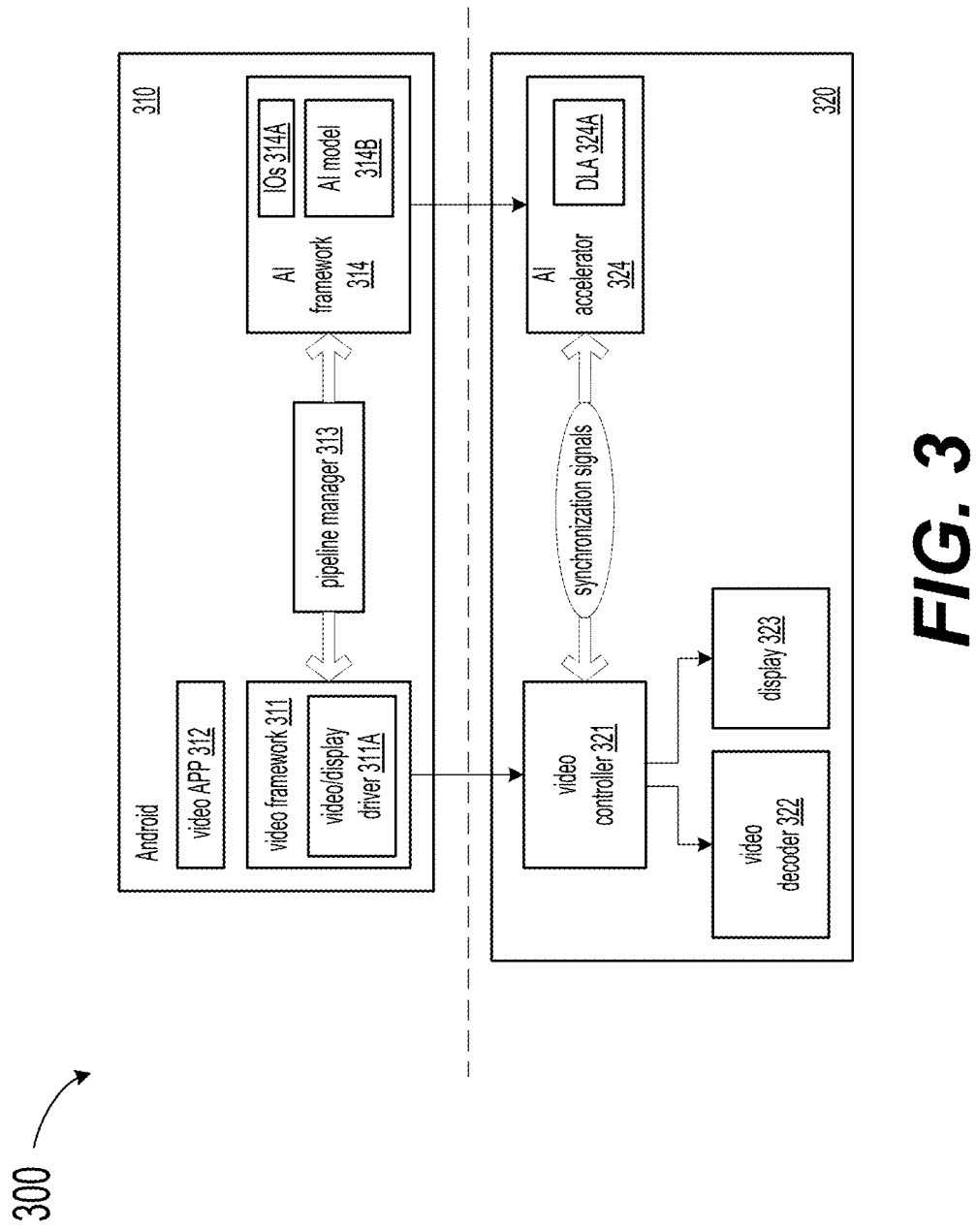
FIG. 3 is a functional block diagram of a video playback system 300.

FIG. 3 is a functional block diagram of a video playback system 300. The video playback system 300 can be installed on a smart phone. The video playback system 300 can include a software portion 310 (e.g., Android system) and a hardware portion 320. Within the software portion 310, a video framework 311, one or more video applications (APP) 312, a pipeline manager 313 and an AI framework 314 can be provided. The video framework 311 can be configured to provide an interface (e.g., application programming interface (API) such as hardware abstraction layer (HAL) API) between software (e.g., the video APP 312) and hardware (e.g., a video decoder 322 and a display 323 within the hardware portion 320) for the video APP 312 to run on the video decoder 322 and the display 323. Therefore, the video APP 312 can access the video decoder 322 indirectly through the API provided by the video framework 311, for example using a video/display driver 311A or kernel included in the video framework 311. The AI framework 314 can be configured to include a variety of software libraries or platforms that provide developers with tools, APIs and pre-built components to build and deploy AI models 314B and applications on an AI accelerator 324 (e.g., including a deep learning accelerator (DLA) 324A such as an APU) within the hardware portion 320. For example, the AI framework 314 can offer a set of functionalities and abstractions that simplify the process of developing the AI models 314B by handling the complex underlying operations and algorithms. In an embodiment, the AI framework 314 can be used for NN model acceleration. The pipeline manager 313 can be configured to set up the detailed rules for the video decoder 322 and the display 323 to communicate with the AI accelerator 324. For example, the pipeline manager 313 can define the size (e.g., ⅓ frame) of a tile partitioned from a frame, the synchronization signals flow between the video decoder 322 and the display 323 and the AI accelerator 324, and when and how to issue the synchronization signals from the video decoder 322 to the AI accelerator 324 and from the AI accelerator 324 to the display 323.

Within the hardware portion 320, a video controller 321 (e.g., a central processing unit (CPU)) can be configured to control the operations of the video decoder 322, the display 323 and the AI accelerator 324. For example, the video controller 321 can control the video decoder 322 to decode a tile partitioned from a frame based on the detailed rules set up by the pipeline manager 313, issue, when the video decoder 322 finishes the decoding of the tile, a synchronization signal to the AI accelerator 324 to instruct the AI accelerator 324 to execute the AI model 314B generated by the AI framework 314 on the decoded tile with IOs 314A, and receive another synchronization signal from the AI accelerator 324 when finishing the execution of the AI model 314B to instruct the display 323 to display the processed tile.

In the video playback system 300, the pipeline manager 313 within the software portion 310 can enable the synchronization signals to be transferred to the video controller 321 and the AI accelerator 324 within the hardware portion 320 indirectly through two independent huge stacks of software such as the video framework 311, the AI framework 314, and some other drivers or kernels (e.g., the video/display driver 311A or kernel), which may take different amounts of time to operate. Accordingly, the video decoder 322, the display 323 and the AI accelerator 324 cannot be controlled to operate on time and cooperate perfectly. The huge stacks of software thus bring the difficulties in reaching hard real-time requirement. For example, after the video decoder 322 decodes a tile, the AI accelerator 324 does not execute the AI model 314B on the decoded tile immediately thereafter, until a non-negligible amount of time consumed by the software passes. To manage the pipeline flow of the video decoder 322, the display 323 and the AI accelerator 324, a variety of software modules are distributed in many distinct sub-systems (e.g., Android, Linux Kernel, the AI accelerator 324 and the video controller 321). These distinct sub-systems must have a sufficient good mechanism in order for them to communicate with each other. Therefore, if one of the software modules is changed (e.g., the AI framework 314 has a new feature added), the others of the software modules and firmware of the hardware components (e.g., the video decoder 322) must be modified accordingly, in order for them to cooperate normally. This increases the efforts of development and maintenance.

Figure 4:
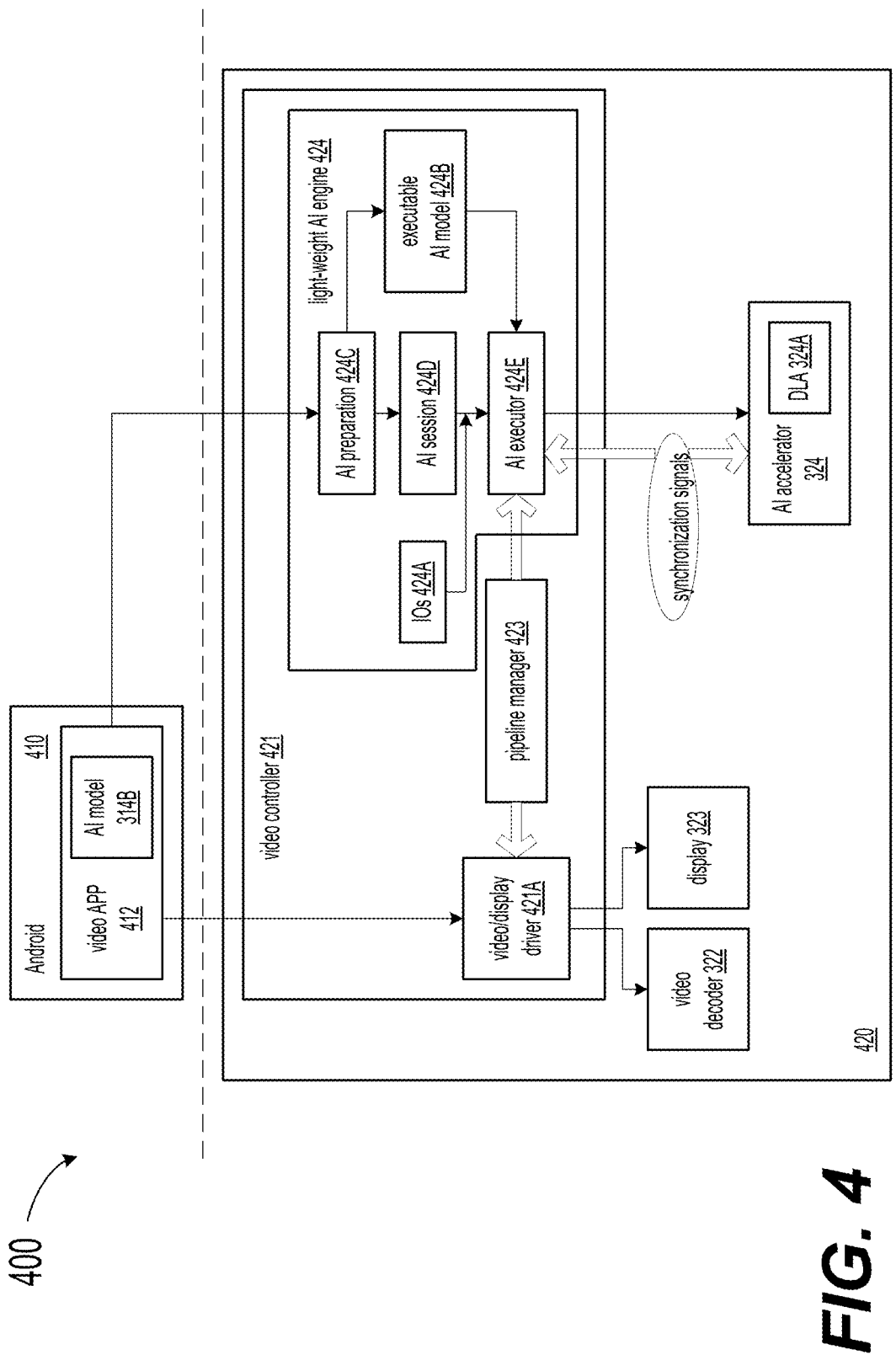
FIG. 4 is a functional block diagram of a video playback system according to some embodiments of the present disclosure.

FIG. 4 is a functional block diagram of a video playback system 400 according to some embodiments of the present disclosure. The video playback system 400 can also be installed on a smart phone. The video playback system 400 can include a software portion 410 (e.g., Android system) and a hardware portion 420. Different from the video playback system 300, which includes the video framework 311 (and the video/display driver 311A), the pipeline manager 313 and the AI framework 314, all of which are included within the software portion 310, the video playback system 400 includes a video/display driver 421A, a pipeline manager 423 and an executable AI model (binary) 424B that are installed within the hardware portion 420, specifically, in a video controller 421. Therefore, the pipeline manager 423 can control the video decoder 322, the display 323 and the AI accelerator 324 directly, without resorting to the software modules, as the pipeline manager 313 does within the software portion 310 of the video playback system 300, and hard real-time requirement can be reached easily. In an embodiment, the pipeline manager 423 can set up the detailed rules for the video decoder 322 and the display 323 to communicate with the AI accelerator 324. For example, the pipeline manager 313 can define the size (e.g., ⅓ frame) of a tile partitioned from a frame, the synchronization signals flow between the video decoder 322 and the display 323 and the AI accelerator 324, and when and how to issue the synchronization signals from the video decoder 322 to the AI accelerator 324 and from the AI accelerator 324 to the display 323.

Within the software portion 410, one or more video APPs 412 and AI models 314B can be provided. Within the hardware portion 420, the executable AI model 424B (which can be executed by the AI accelerator 324) and a corresponding control flow (including an AI executor 424E, an AI session 424D such as the identifier (ID) of the AI model 314B, and IOs 424A such as the input address of a decoded tile (e.g., the address of the AI accelerator 324) decoded by the video decoder 322 and the output address of a processed tile (e.g., the address of the display 323) processed by the AI accelerator 324) can be prepared by AI preparation 424C. In an embodiment, a light-weight AI engine 424 can be provided in the video controller 421 to include the IOs 424A, the executable AI model 424B, the AI preparation 424C, the AI session 424D and the AI executor 424E.

In operation, the video/display driver 421A can be instructed by the pipeline manager 423 to control the video decoder 322 to decode a tile (e.g., ⅓ frame) partitioned from a frame based on the detailed rules set up by the pipeline manager 423. The video decoder 322, after decoding the tile, can transfer the decoded tile to the AI accelerator 324, and the pipeline manager 423 can inform the AI executor 424E to trigger the AI accelerator 324 to execute the executable AI model 424B on the decoded tile by determining the AI session 424D. For example, the AI executor 424E can issue a synchronization signal to the AI accelerator 324 to trigger the AI accelerator 324 to execute the executable AI model 424B on the decoded tile. The AI accelerator 324, after executing the executable AI model 424B on the decoded tile, can transfer the processed tile to the display 323, and the pipeline manager 423 can inform the video/display driver 421A to control the display 323 to display the processed tile. For example, the AI accelerator 324 can issue another synchronization signal to the AI executor 424E to inform the AI executor 424E of the complete of execution of the executable AI model 424B on the decoded tile. As the pipeline manager 423 can control the operations of the video decoder 322, the display 323, the AI executor 424E and the AI accelerator 324 directly, without resorting to the software modules included in the video playback system 300 and thus no software lag incurred, the hard real-time requirement can be reached. Therefore, the video decoder 322 can decode and the display 323 can display more frames (e.g., more than 60 frames) per second.

As installed in the video controller 421, specifically, in the light-weight AI engine 424, the executable AI model 424B will not be disturbed by Android or Linux, which are always busy on performing a variety of tasks. Therefore, the video playback system 400 can run more stably and smoothly than the video playback system 300. As the software stack used in Android or Linux is greatly reduced, the video playback system 400 is more secured than the video playback system 300.

Figure 5:
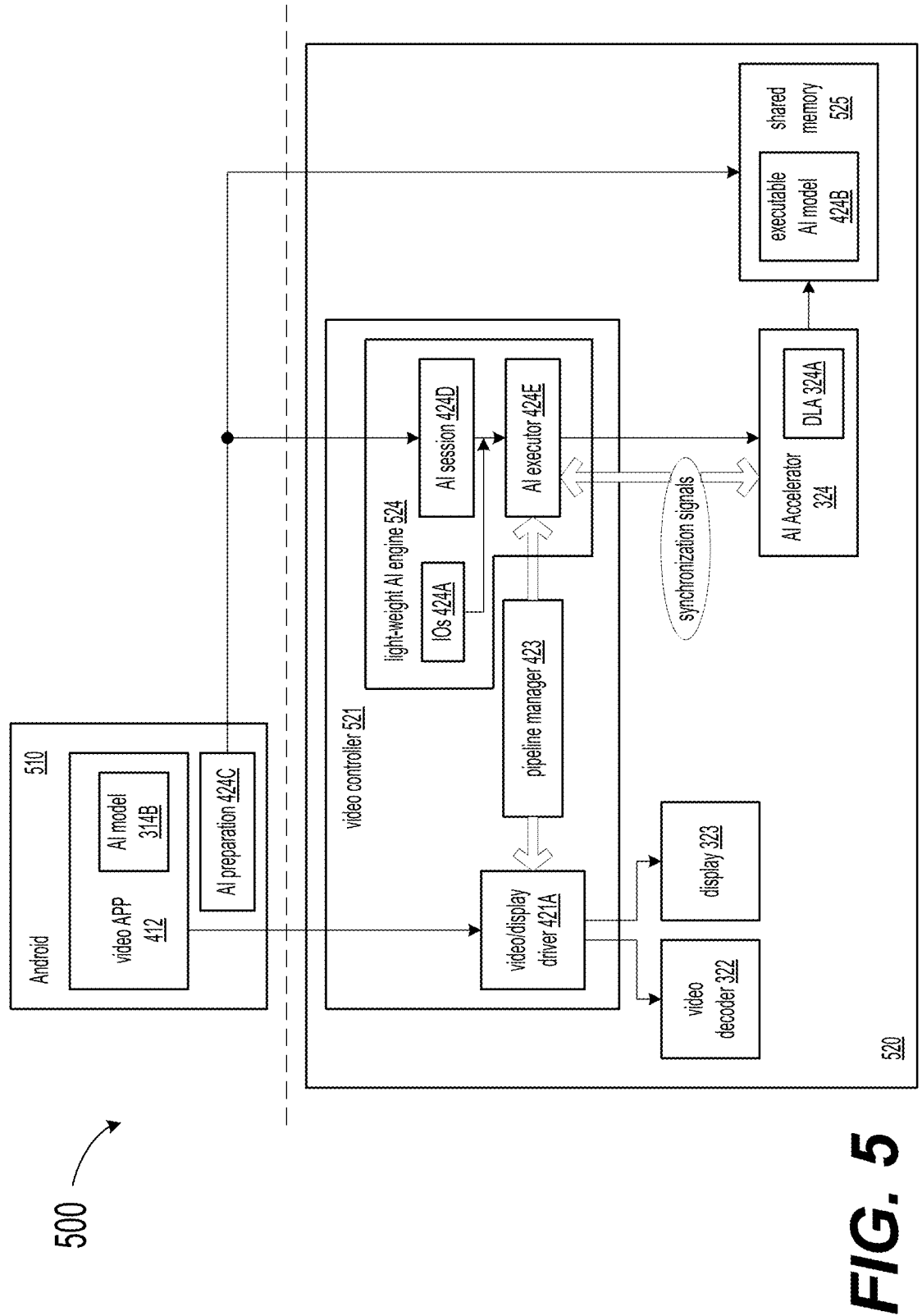
FIG. 5 is a functional block diagram of another video playback system according to some embodiments of the present disclosure.

FIG. 5 is a functional block diagram of a video playback system 500 according to some embodiments of the present disclosure. The video playback system 500 can also be installed on a smart phone. The video playback system 500 can include a software portion 510 (e.g., Android system) and a hardware portion 520. Different from the video playback system 400, which includes the AI preparation 424C and the executable AI model 424B in the light-weight AI engine 424, the video playback system 500 locates the AI preparation 424C and the executable AI model 424B in the software portion 510 and a shared memory 525 within the hardware portion 520, respectively. The video playback system 500 can include a light-weight AI engine 524 that is located in the hardware portion 520, specifically, in a video controller 521, and includes the IOs 424A, the AI session 424D and the AI executor 424E only. Therefore, the light-weight AI engine 524 can have a smaller memory than the light-weight AI engine 424. In an embodiment, the shared memory 525 can be coupled to the AI accelerator 324 and include a dynamic random access memory (DRAM), an on-bus SRAM, or a serial flash memory. In the example embodiment shown in FIG. 5, the shared memory 525 is located outside the video controller 521. In various embodiments, the shared memory 525 can be located in the video controller 521. The AI preparation 424C can prepare the executable AI model 424B and a corresponding control flow (including the AI session 424D such as the identifier (ID) of the AI model 314B, and IOs 424A such as the input address of a decoded tile (e.g., the address of the AI accelerator 324) decoded by the video decoder 322 and the output address of a processed tile (e.g., the address of the display 323) processed by the AI accelerator 324), and load the executable AI model 424B and the corresponding control flow into the shared memory 525 and the light-weight AI engine 524, respectively.

In operation, the shared memory 525 and the light-weight AI engine 524 can receive the executable AI model 424B and its corresponding control flow (including the AI executor 424E, the IOs 424A and the AI session 424D) prepared by the AI preparation 424C. Then the video/display driver 421A can be instructed by the pipeline manager 423 to control the video decoder 322 to decode a tile (e.g., ⅓ frame) partitioned from a frame based on the detailed rules set up by the pipeline manager 423. The video decoder 322, after decoding the tile, can transfer the decoded tile to the AI accelerator 324, and the pipeline manager 423 can inform the AI executor 424E to trigger the AI accelerator 324 to execute the executable AI model 424B on the decoded tile by determining the AI session 424D. For example, the AI executor 424E can issue a synchronization signal to the AI accelerator 324 to trigger the AI accelerator 324 to execute the executable AI model 424B on the decoded tile. The AI accelerator 324 can get the executable AI model 424B from the shared memory 525 and execute the executable AI model 424B on the decoded tile. After executing the executable AI model 424B on the decoded tile, the AI accelerator 324 can transfer the processed tile to the display 323, and the pipeline manager 423 can inform the video/display driver 421A to control the display 323 to display the processed tile. For example, the AI accelerator 324 can issue another synchronization signal to the AI executor 424E to inform the AI executor 424E of the complete of execution of the executable AI model 424B on the decoded tile.

In the example embodiment shown in FIG. 5, the AI preparation 424C and the executable AI model 424B are located within the software portion 510 and in the shared memory 525 within the hardware portion 520, respectively. In some embodiments, the AI preparation 424C can be located within the software portion 510, and the executable AI model 424B can be loaded into the light-weight AI engine 524. In various embodiments, the AI preparation 424C can be loaded into the light-weight AI engine 524, and the executable AI model 424B can be loaded into the shared memory 525.

Figure 6:
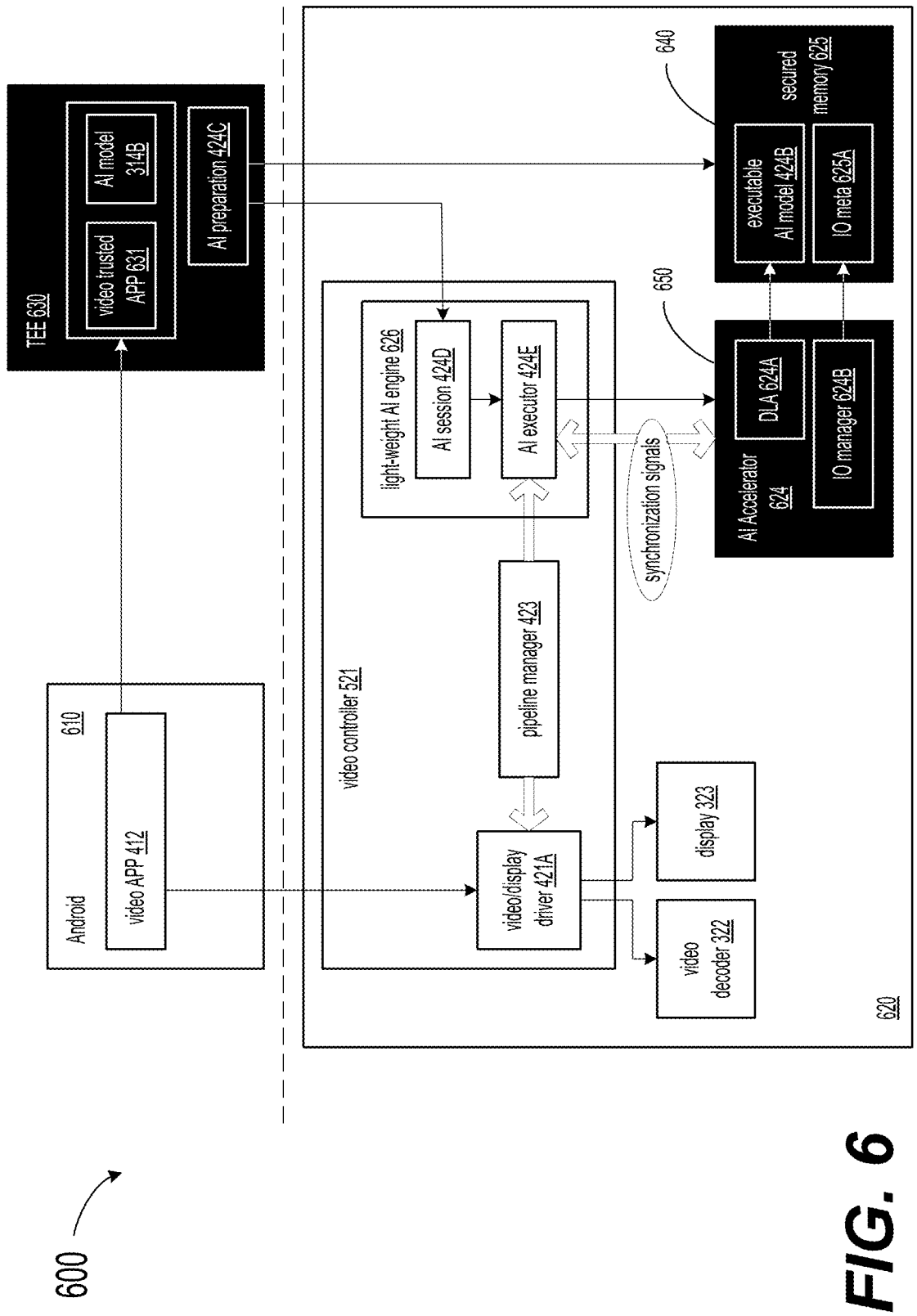
FIG. 6 is a functional block diagram of yet another video playback system according to some embodiments of the present disclosure.

FIG. 6 is a functional block diagram of a video playback system 600 according to some embodiments of the present disclosure. The video playback system 600 can also be installed on a smart phone. The video playback system 600 can be used to decode, process and display video frames (e.g., copyrighted) that need to be protected from being attacked, stolen or tampered with. For example, the video playback system 600 can provide a secure video path where video contents are decrypted and decompressed securely. The video playback system 600 can also include a software portion 610 and a hardware portion 620. In an embodiment, the AI preparation 424C and the AI models 314B are located within and protected by a secure environment 630 (e.g., a trusted execution environment (TEE) (shown in black background)) provided by a secure operating system (OS). In another embodiment, a video trusted APP 631 can be installed in the secure OS and configured to generate the executable AI model 424B to prevent hackers attacks. The AI preparation 424C can prepare, within the TEE 630, the executable AI model 424B and a corresponding control flow (including the AI executor 424E, the AI session 424D such as the identifier (ID) of the AI model 314B, and IO meta 525A summarizing basic information about the IOs 424A, and load the AI session 424D and the AI executor 424E into a light-weight AI engine 626 and the IO meta 625A and the executable AI model 424B into a secured memory 625. In an embodiment, the secured memory 625 can be well protected via a first firewall 640 (shown in black background), and the IO meta 625A and the executable AI model 424B (e.g., an instruction set (ISA)) loaded into the secured memory 625 can thus be protected from being damaged, stolen and tampered with.

In an embodiment, the video playback system 600 can further include an AI accelerator 624 coupled between the light-weight AI engine 626 and the secured memory 625. For example, the AI accelerator 624 can include a DLA 624A (such as an APU) configured to execute the executable AI model 424B loaded into the secured memory 625 on a decoded tile that is decoded by the video decoder 322, and an IO manager 624B configured to manage the IO meta 625A (e.g., changing IO addresses) for the execution of the executable AI model 424B. In an embodiment, the AI accelerator 624 can also be well protected via a second firewall 650 (shown in black background) that can be the same as or different from the first firewall 640.

In operation, the secured memory 625 and the light-weight AI engine 626 can receive the executable AI model 424B and its corresponding control flow (including the AI executor 424E, the IO meta 625A and the AI session 424D) that the AI preparation 424C prepares within the TEE 630. Then the video/display driver 421A can be instructed by the pipeline manager 423 to control the video decoder 322 to decode a tile (e.g., ⅓ frame) partitioned from a frame based on the detailed rules set up by the pipeline manager 423. The video decoder 322, after decoding the tile, can transfer the decoded tile to the AI accelerator 624, and the pipeline manager 423 can inform the AI executor 424E to trigger the AI accelerator 624 to execute the executable AI model 424B on the decoded tile by determining the AI session 424D. For example, the AI executor 424E can issue a synchronization signal to the AI accelerator 624 to trigger the AI accelerator 624 to execute the executable AI model 424B on the decoded tile. The AI accelerator 624 (specifically, the DLA 624A) can get the executable AI model 424B from the secured memory 625 and execute the executable AI model 424B on the decoded tile based on the IO manager's 624B accessing to the IO meta 625A (such as the input address of the decoded tile). After executing the executable AI model 424B on the decoded tile, the AI accelerator 624 can transfer the processed tile to the display 323 (based on the IO manager's 624B accessing to the IO meta 625A, such as the output address of the processed tile, e.g., the address of the display 323), and the pipeline manager 423 can inform the video/display driver 421A to control the display 323 to display the processed tile. For example, the AI accelerator 624 can issue another synchronization signal to the AI executor 424E to inform the AI executor 424E of the complete of execution of the executable AI model 424B on the decoded tile.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A video playback system, comprising:
    a hardware video controller configured to receive one or more video frames and partition each of the video frames into a plurality of video tiles;
    a hardware video decoder coupled to the video controller, the video decoder configured to decode a video tile of the video tiles partitioned from each of the video frames to generate a decoded video tile;

a hardware artificial intelligence (AI) accelerator coupled to the video controller and the video decoder, the AI accelerator configured to receive the decoded video tile and execute an executable AI model on the decoded video tile to generate a processed video tile;

a hardware display coupled to the video controller and the AI accelerator, the display configured to receive and display the processed video tile; and a pipeline manager installed in the video controller, the pipeline manager configured to directly control the video decoder to decode the video tile to generate the decoded video tile, directly control the AI accelerator to execute the executable AI model on the decoded video tile to generate the processed video tile, and directly control the display to display the processed video tile by generating and receiving a plurality of synchronization signals.

2. The video playback system of claim 1, wherein the pipeline manager controls the AI accelerator to execute the executable AI model on the decoded video tile by issuing a synchronization signal of the plurality of synchronization signals to the AI accelerator when the video decoder generates the decoded video tile and controls the display to display the processed video tile by receiving another synchronization signal of the plurality of synchronization signals, wherein the other synchronization signal is issued by the AI accelerator when the AI accelerator generates the processed video tile.

3. The video playback system of claim 1, further comprising:

an AI engine installed in the video controller and coupled to the pipeline manager and the AI accelerator, wherein the pipeline manager is further configured to instruct the AI engine to trigger the AI accelerator to execute the executable AI model on the decoded video tile.

4. The video playback system of claim 3, wherein the AI engine is configured for the executable AI model to be loaded thereinto.

5. The video playback system of claim 4, wherein the executable AI model is prepared based on an AI model and generated in the AI engine.

6. The video playback system of claim 1, further comprising:

a memory coupled to the AI accelerator, the memory configured for the executable AI model to be loaded thereinto.

7. The video playback system of claim 6, wherein the memory is protected by a first firewall.

8. The video playback system of claim 7, wherein the AI accelerator is protected by a second firewall.

9. The video playback system of claim 8, wherein the second firewall is a same as the first firewall.

10. The video playback system of claim 8, wherein the executable AI model is prepared based on an AI model and generated within a trusted execution environment (TEE) provided by a secure operating system (OS).

11. The video playback system of claim 6, wherein the memory includes a dynamic random access memory (DRAM).

12. The video playback system of claim 6, wherein the memory includes an on-bus SRAM.

13. The video playback system of claim 6, wherein the memory includes a serial flash memory.

14. The video playback system of claim 1, wherein the AI accelerator includes a deep learning accelerator (DLA).

15. The video playback system of claim 14, wherein the DLA includes an accelerated processing unit (APU).

16. The video playback system of claim 1, wherein the video controller includes a central processing unit (CPU).

17. The video playback system of claim 1, which is installed on a smart phone.

* * * * *